United States Patent
Park et al.

(10) Patent No.: US 7,503,572 B2
(45) Date of Patent: Mar. 17, 2009

(54) RETRACTABLE VEHICLE STEP

(76) Inventors: Brenda K. Park, 108 Chilko Ct., Chesnee, SC (US) 29323; Richard C. Rodgers, 140 Simon Dr., Moore, SC (US) 29369

( * ) Notice: Subject to any disclaimer, the term of this patent is extended or adjusted under 35 U.S.C. 154(b) by 226 days.

(21) Appl. No.: 11/505,747

(22) Filed: Aug. 17, 2006

(65) Prior Publication Data
US 2008/0042394 A1   Feb. 21, 2008

(51) Int. Cl.
*A60K 3/00* (2006.01)
(52) U.S. Cl. .................. 280/163; 280/166; 280/477; 280/165; 280/164.1
(58) Field of Classification Search ............. 280/163, 280/166, 477, 165, 164.1; 296/62
See application file for complete search history.

(56) References Cited

U.S. PATENT DOCUMENTS

| | | | | |
|---|---|---|---|---|
| 2,575,615 A | * | 11/1951 | Crump | 182/95 |
| 3,462,170 A | * | 8/1969 | Smith et al. | 280/166 |
| 3,858,905 A | * | 1/1975 | Peebles | 280/163 |
| 4,020,920 A | * | 5/1977 | Abbott | 182/19 |
| 4,180,143 A | | 12/1979 | Clugston | |
| 4,412,686 A | | 11/1983 | Fagrell | |
| 4,733,752 A | * | 3/1988 | Sklar | 182/86 |
| 5,005,850 A | * | 4/1991 | Baughman | 280/166 |
| 5,039,119 A | * | 8/1991 | Baughman | 280/166 |
| 5,513,866 A | | 5/1996 | Sisson | |
| 5,547,040 A | * | 8/1996 | Hanser et al. | 182/88 |
| 5,716,064 A | | 2/1998 | Frerichs | |
| 5,803,475 A | * | 9/1998 | Dick | 280/163 |
| 5,897,125 A | | 4/1999 | Bundy | |
| 6,036,208 A | | 3/2000 | Frerichs | |
| 6,511,086 B2 | | 1/2003 | Schlicht | |
| 6,685,204 B1 | | 2/2004 | Hehr | |
| 2003/0116938 A1 | | 6/2003 | Shields et al. | |
| 2005/0275187 A1 | | 12/2005 | Chaudoin et al. | |
| 2006/0091637 A1 | | 5/2006 | Knittel | |

* cited by examiner

*Primary Examiner*—Christopher Ellis
*Assistant Examiner*—Cynthia F. Collado
(74) *Attorney, Agent, or Firm*—J. Bennett Mullinax, LLC

(57) ABSTRACT

A retractable vehicle step for use in allowing a user to access a vehicle is provided. The retractable vehicle step includes a mounting bracket that can be configured for attachment with a trailer hitch receiver of the vehicle. A pair of arms are provided and are pivotally attached to the mounting bracket. The pair of arms are movable between an extended position and a retracted position. A step is carried by the pair of arms. The step is configured for being stepped on by the user to access the vehicle.

19 Claims, 7 Drawing Sheets

RETRACTABLE VEHICLE STEP

FIELD OF THE INVENTION

The present invention relates generally to a retractable vehicle step that allows a user to more easily access the back portion and possibly roof of a vehicle. More particularly, the present application involves a retractable vehicle step that can be removably connected to the trailer hitch at the rear of a vehicle and may incorporate a tow ball.

BACKGROUND

Vehicles such as trucks, vans and sport utility vehicles have rear cargo areas that are accessed by the user. For example, the user may need to lower the tailgate of a pick-up truck and climb onto the bed of the truck in order to remove boxes or other items transported therein. Although lowered, the tailgate of the truck may be located at a height that cannot be easily reached from the ground. In this instance, the user must grab onto a portion of the bed in order to aid in climbing on top of the tailgate. Further, the tailgate is at a height that requires one to jump down from the tailgate instead of stepping down. As such, stepping onto and off of the bed of the pick-up truck can be a daunting task. This task is rendered especially difficult when one's hands are fully loaded with items being removed or placed onto the bed of the pick-up truck. Stepping devices have been proposed to allow one to more easily access areas of a vehicle such as the bed of a pick-up truck.

Many of today's vehicles include a trailer hitch receiver that is located at the rear end of the vehicle. The trailer hitch receiver is typically a two inch by two inch receptacle into which a corresponding hitch of a trailer is received. A pin can be disposed through the hitch and receiver in order to effect attachment. The trailer could alternatively be attached to a tow ball which in turn is attached to the trailer hitch receiver. Prior devices have been proposed that utilize the trailer hitch of a vehicle in attaching a vehicle step for aiding a user in accessing the rear of the vehicle. One such vehicle step includes a linearly extending portion that has a multiplicity of holes defined along its length. The linearly extending portion can be attached to the trailer hitch receiver. A foldable step onto which a user may step to aid in accessing the back or top of the vehicle is attached to one end of the linearly extending portion. A user can slide the linearly extending portion along its length to a desired position at which time the pin can be disposed therethrough to lock the device in place so that the step is desirably located. One problem with such a device resides in the length of the linearly extending portion. The trailer hitch receiver may only be of a limited depth. In this instance, the device cannot be placed in a retracted position but must instead remain at all times extended.

Other stepping devices have been proposed that allow for the step to be completely retracted even when the trailer hitch receiver has a limited depth. One such device includes a bracket that is received within and extends below the trailer hitch receiver. The linearly extending portion is positioned along the part of the bracket that is below the trailer hitch receiver. This portion of the bracket does not have a limited depth, and the linearly extending portion can be placed in a fully retracted position so that the step is in turn able to be completely retracted. With such a configuration, portions of the stepping device are held below the trailer hitch receiver and consequently are closer to the ground. This situation may be undesirable in that the stepping device is more prone to scraping the ground and being damaged. Stepping devices of the aforementioned type must also be removed from the trailer hitch receiver and then reattached every time the step is extended and retracted. Further, if one needs to attach a tow ball to the trailer hitch receiver for purposes of towing a vehicle or trailer, the stepping device must be removed and stored. As such, there remains room for variation and improvement within the art.

SUMMARY

Various features and advantages of the invention will be set forth in part in the following description, or may be obvious from the description, or may be learned from practice of the invention.

The present invention provides for, in one aspect, a retractable vehicle step for use in allowing a user to access a vehicle. A mounting bracket is present and is configured for attachment with a trailer hitch receiver of a vehicle. A pair of arms are also included and are pivotally attached to the mounting bracket. The pair of arms are movable between an extended position and a retracted position. A step is also present and is carried by the pair of arms. The step is configured for being stepped on by the user to access the vehicle. The step is closer to the mounting bracket in the retracted position of the pair of arms than in the extended position of the pair of arms.

Another aspect of the present invention resides in a retractable vehicle step as immediately discussed in which a first arm of the pair of arms has a first portion that is pivotally attached to a second portion. A second arm of the pair of arms has a first portion that is pivotally attached to a second portion.

A further aspect of the present invention exists in a retractable vehicle step as immediately discussed in which an end of the first portion of the first arm and an end of the first portion of the second arm are pivotally attached to the mounting bracket. The aforementioned attachment acts to effect pivotal attachment of the pair of arms to the mounting bracket. A step bracket is also included and is pivotally attached to an end of the second portion of the first arm. The step bracket is also pivotally attached to an end of the second portion of the second arm. The step bracket carries the step.

An additional aspect of the present invention resides in a retractable vehicle step as discussed above that further includes a tow ball attached to the mounting bracket.

Another aspect of the present invention is found in a retractable vehicle step as previously mentioned in which the pair of arms extend farther outboard in the longitudinal direction of the vehicle when the pair of arms are in the retracted position as opposed to the extended position. The aforementioned arrangement exists when the mounting bracket is attached to the trailer hitch receiver.

Another exemplary embodiment of the present invention exists in a retractable vehicle step as previously mentioned where the pair of arms are unlatched when in the retracted position. The step is pivotable between a use position and a stored position. The step is also unlatched when in the use position and when in the stored position.

A further aspect of the present invention is found in a retractable vehicle step that is used for allowing a user to access a vehicle. The retractable vehicle step has a mounting bracket that is configured for attachment with the rear of the vehicle. A tow ball is present and is attached to the mounting bracket. A step is also included and is carried by the mounting bracket. The step is configured for being stepped on by the user to access the vehicle. The step is also movable between an extended position and a retracted position.

Another aspect of the present invention resides in a retractable vehicle step as previously mentioned that further includes a pair of arms. The arms are pivotally attached to the mounting bracket. The pair of arms are also movable between an extended position and a retracted position.

A further aspect of the present invention is found in a retractable vehicle step as immediately mentioned in which a first arm of the pair of arms has a first portion that is pivotally attached to a second portion. A second arm of the pair of arms has a first portion that is pivotally attached to a second portion. An end of the first portion of the first arm and an end of the first portion of the second arm are pivotally attached to the mounting bracket. This attachment acts to pivotally attach the pair of arms to the mounting bracket. A step bracket is also present and is pivotally attached to an end of the second portion of the first arm. The step bracket is also pivotally attached to an end of the second portion of the second arm. The step bracket carries the step.

Another aspect of the present invention is found in a retractable vehicle step as previously mentioned in which the step has a stepping surface onto which the user can step to access the vehicle. The step is configured for being oriented between a use position and a stored position. In the use position the stepping surface is substantially horizontal, and in the stored position the stepping surface is substantially vertical.

A further aspect of the present invention is found in a retractable vehicle step as previously discussed in which the mounting bracket has a trailer hitch engagement member. The trailer hitch engagement member has a square shaped outer perimeter. The trailer hitch engagement member is configured for attachment to a trailer hitch receiver of the vehicle.

Another aspect of the present invention resides in a retractable vehicle step for use in allowing a user to access a vehicle. A mounting bracket is included and is configured for attachment with a trailer hitch receiver of a vehicle. A tow ball is attached to the mounting bracket. A pair of arms are present and are movable between an extended position and a retracted position. A first arm of the pair of arms has a first portion that is pivotally attached to a second portion. A second arm of the pair of arms has a first portion that is pivotally attached to a second portion. The first portion of the first arm is pivotally attached to the mounting bracket. Also, the first portion of the second arm is pivotally attached to the mounting bracket. A locking member is included and is configured for locking the pair of arms in the extended position. A step bracket is also present. The second portion of the first arm is pivotally attached to the step bracket. The second portion of the second arm is likewise pivotally attached to the step bracket. A step is pivotally attached to the step bracket. The step has a stepping surface onto which the user can step to access the vehicle. The step is configured for being pivoted between a use position and a stored position. In the use position the stepping surface is substantially horizontal, and in the stored position the stepping surface is substantially vertical.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
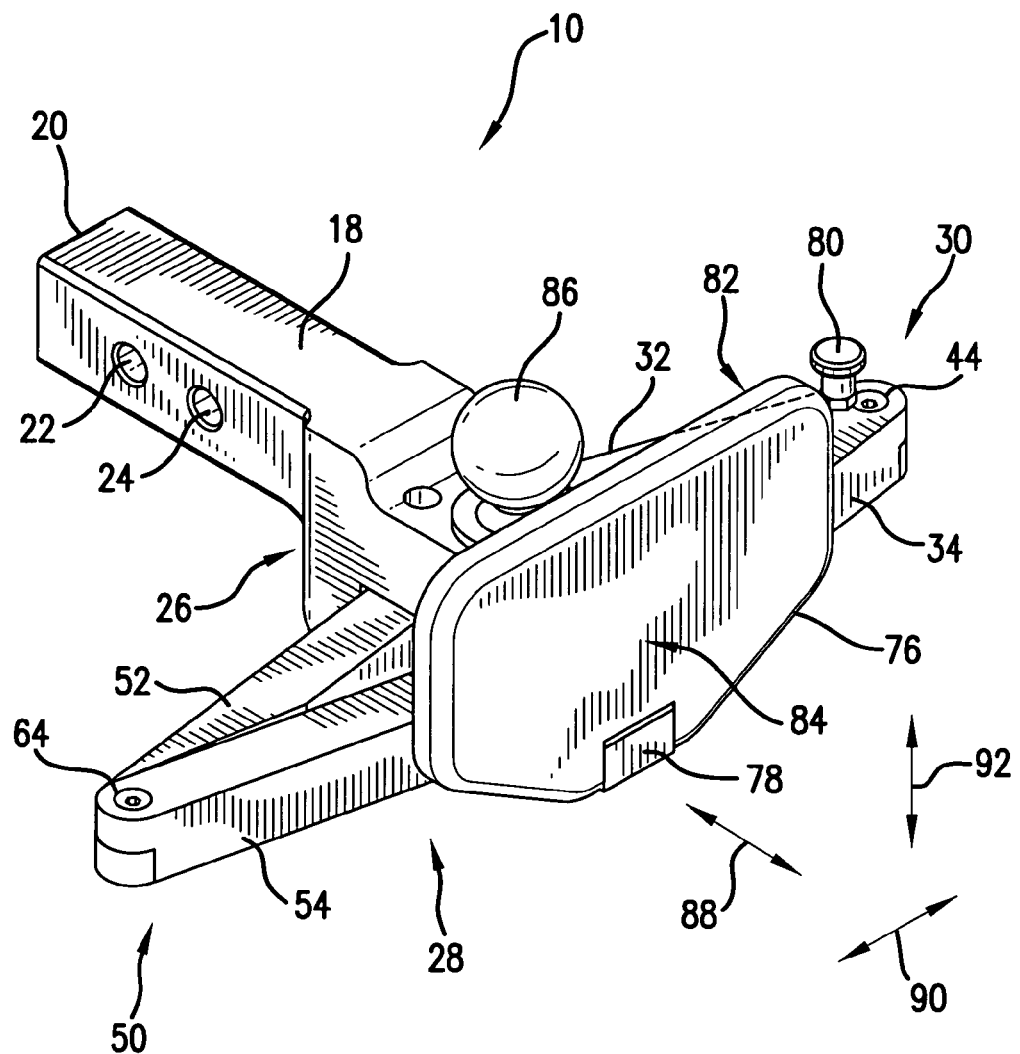
FIG. 1 is a perspective view of a retractable vehicle step in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present application provides for a retractable vehicle step 10 that assists a user in accessing a vehicle 12. The user can use the retractable vehicle step 10 to more easily access the tailgate, bed, rear cargo area or roof of the vehicle 12. The retractable vehicle step 10 includes a step 76 onto which the user can step or stand to order to assist in entering or exiting the vehicle 12. The retractable vehicle step 10 is capable of being attached to a trailer hitch receiver 16 commonly found on vehicles 12. The retractable vehicle step 10 can be adjusted into an extended position for stepping thereon in the event a tailgate 94 of the vehicle 12 is moved into the lowered position. A tow ball 86 may also be incorporated into the retractable vehicle step 10. In this instance, the retractable vehicle step 10 does not have to be removed from the vehicle 12 should one desire to use the tow ball 86 for the towing of a trailer, boat or vehicle.

An exemplary embodiment of the stand 10 is shown in FIG. 1 and includes a mounting bracket 18 that carries a tow ball 86. A coupling body of a trailer can be attached to the tow ball 86 for towing purposes. The tow ball 86 can be a one piece element so that the ball and shank of the tow ball 86 are integrally formed with one another. The tow ball 86 can be attached to the mounting bracket 18 in a number of ways. For example, an appropriate nut and washer connection (not shown) may be used to attach the tow ball 86. Additionally, the tow ball 86 can be welded onto the mounting bracket or attached with other types of mechanical fasteners. In other embodiments, the tow ball 86 may be integrally formed with the mounting bracket 18 so that these components are essentially a single element piece. Tow balls 86 of different sizes or strengths can be attached to the mounting bracket 18 in response to the needs of the trailer or other item that is to be towed thereby. It is to be understood, however, that the tow ball 86 is not present in the retractable vehicle step 10 in accordance with other exemplary embodiments of the present invention.

The mounting bracket 18 includes a trailer hitch engagement member 20 that defines a pair of apertures 22 and 24 therethrough. The trailer hitch engagement member 20 is a square shaped tubular member and has an outer perimeter that is square shaped. The retractable vehicle step 10 is shown attached to a vehicle 12 in FIGS. 2 and 3. To effect this attachment, the trailer hitch engagement member 20 is inserted into a trailer hitch receiver 16 of the vehicle 12. The trailer hitch receiver 16 is typically a two inch by two inch square receptacle that allows for the attachment of a tow bar or tow ball to the vehicle 12 for towing purposes. The trailer hitch receiver 16 can be a piece of original equipment that is supplied by the manufacturer of the vehicle 12, or the trailer hitch receiver 16 can be an after market item that is purchased and attached to the vehicle 12 by the user. Although the trailer hitch engagement member 20 is configured to allow for attachment to standard trailer hitch receivers 16, the trailer hitch engagement member 20 can be variously configured in other embodiments to allow for attachment to differently configured trailer hitch receivers 16 as necessary. A pin 96 can be disposed through aperture 22 or 24 in order effect attachment of the trailer hitch engagement member 20 to the trailer hitch receiver 16. A pair of apertures 22 and 24 are provided in order to account for variously configured trailer hitch receivers 16 of differing vehicles 12. The apertures 22 and 24 also allow for the retractable vehicle step 10 to be selectively positioned along the trailer hitch receiver 16. If desired, and if possible a pair of pins 96 can be used to effect attachment so that they are located through both apertures 22 and 24. It is to be understood, however, that only a single aperture 22 or 24 need be present in accordance with other exemplary embodiments.

Figure 2:
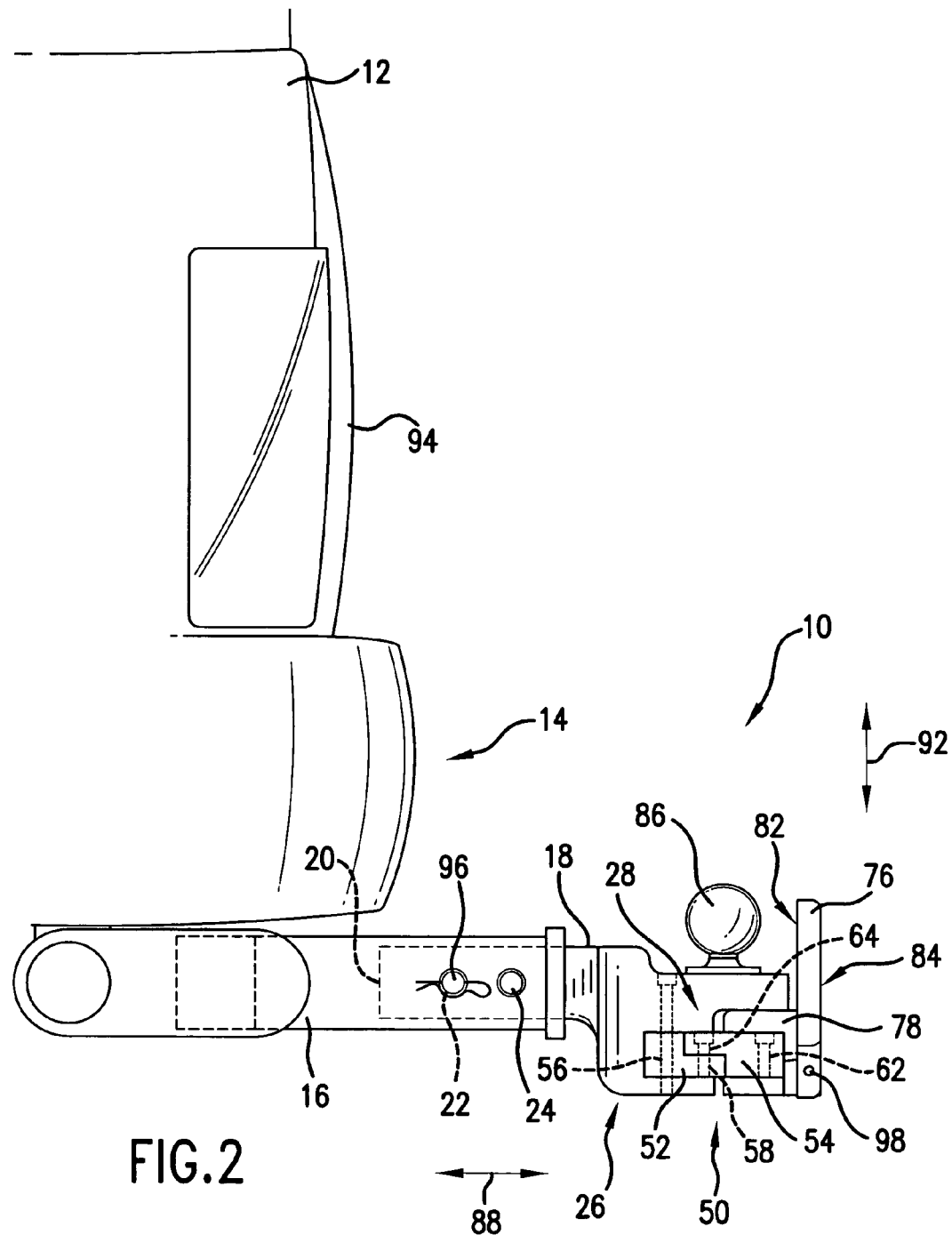
FIG. 2 is a side view of the retractable vehicle step of FIG. 1 attached to a vehicle and in a retracted position.

The retractable vehicle step 10 also includes a linkage that has a pair of arms 28. As shown, the pair of arms 28 are located in a retracted position in which they are retained in close proximity to the mounting bracket 18. With reference to FIG. 2, the pair of arms 28 are shown to be contained completely within a body 26 of the mounting bracket 18 in the longitudinal direction 88 of the vehicle 12 to which the retractable vehicle step 10 is attached. The pair of arms 28 carry a step 76 which is oriented in a non-use position as shown in FIG. 2.

Figure 3:
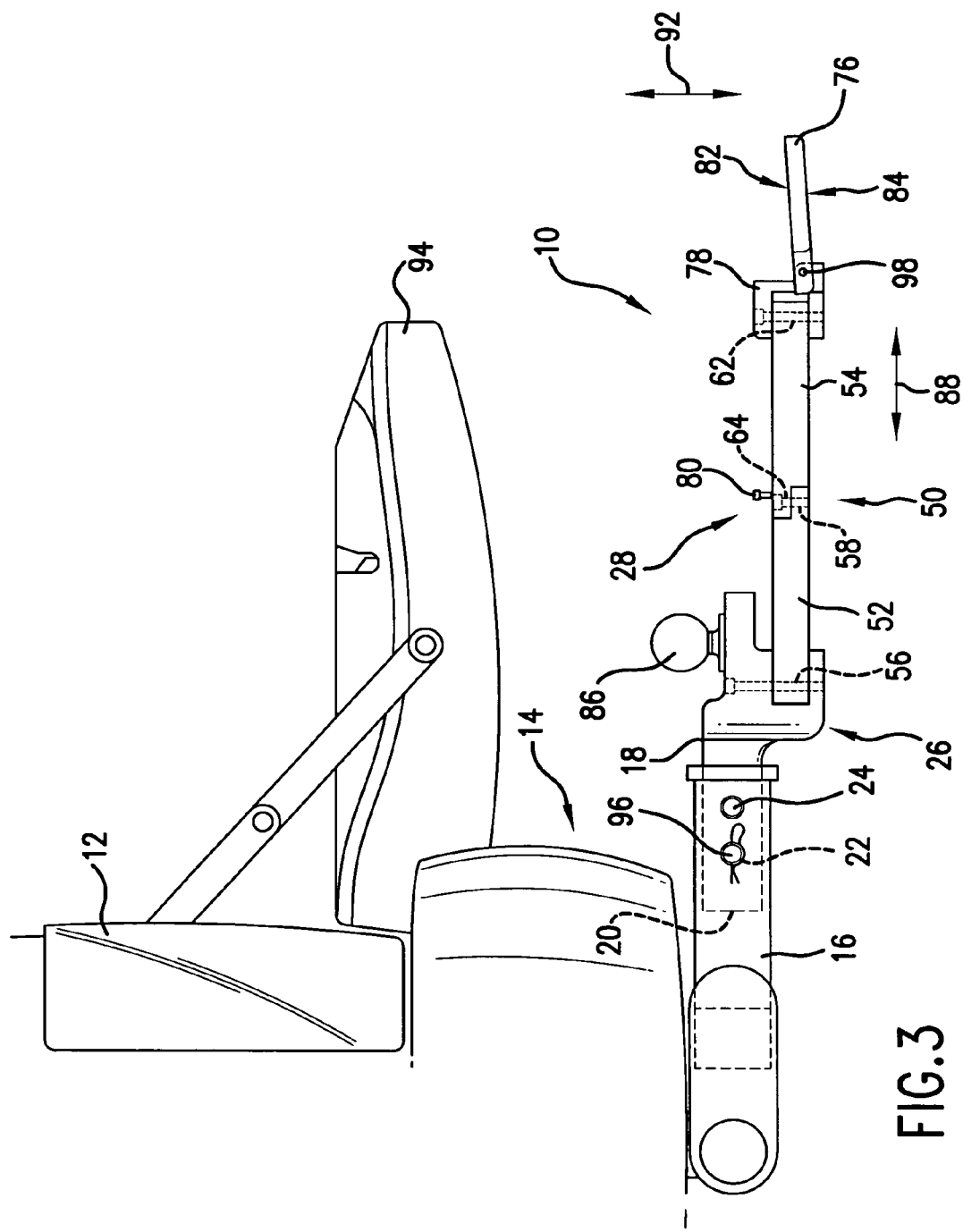
FIG. 3 is a side view of the retractable vehicle step of FIG. 1 attached to a vehicle and in an extended position with a tailgate lowered.

The retractable vehicle step 10 is shown in an extended position in FIG. 3. Here, the pair of arms 28 are extended rearward in the longitudinal direction 88 so as to extend away from the mounting bracket 18. The step 76 is oriented into a use position that allows the user to step or stand thereon for purposes of accessing, entering or exiting the vehicle 12. As shown, the tailgate 94 of the vehicle 12 is lowered in FIG. 3.

The pair of arms 28 extend rearward in the longitudinal direction 88 a sufficient distance to allow the step 76 to be positioned rearward of the tailgate 94 in the longitudinal direction 88. This positioning allows the user to step onto the step 76 and then onto the tailgate 94 to subsequently access the bed of the vehicle 12. The user can also use the step 76 when descending the tailgate 94 to the ground so that the user does not have to jump from the tailgate 94 directly to the ground. Such a step 76 may be especially beneficial when transporting items to and from the vehicle 12. Although shown as being used in relation with a vehicle 12 that includes a tailgate 94, the retractable vehicle step 10 can be used on a variety of vehicles 12 that do or do not have a tailgate 94. The retractable vehicle step 10 can be used with cars, trucks, recreational vehicles and sport utility vehicles in accessing various portions thereof. After the retractable vehicle step 10 is used to access the vehicle 12, the step 76 can be folded up and the pair of arms 28 can be reoriented into the retracted position as shown in FIG. 2.

Figure 4:
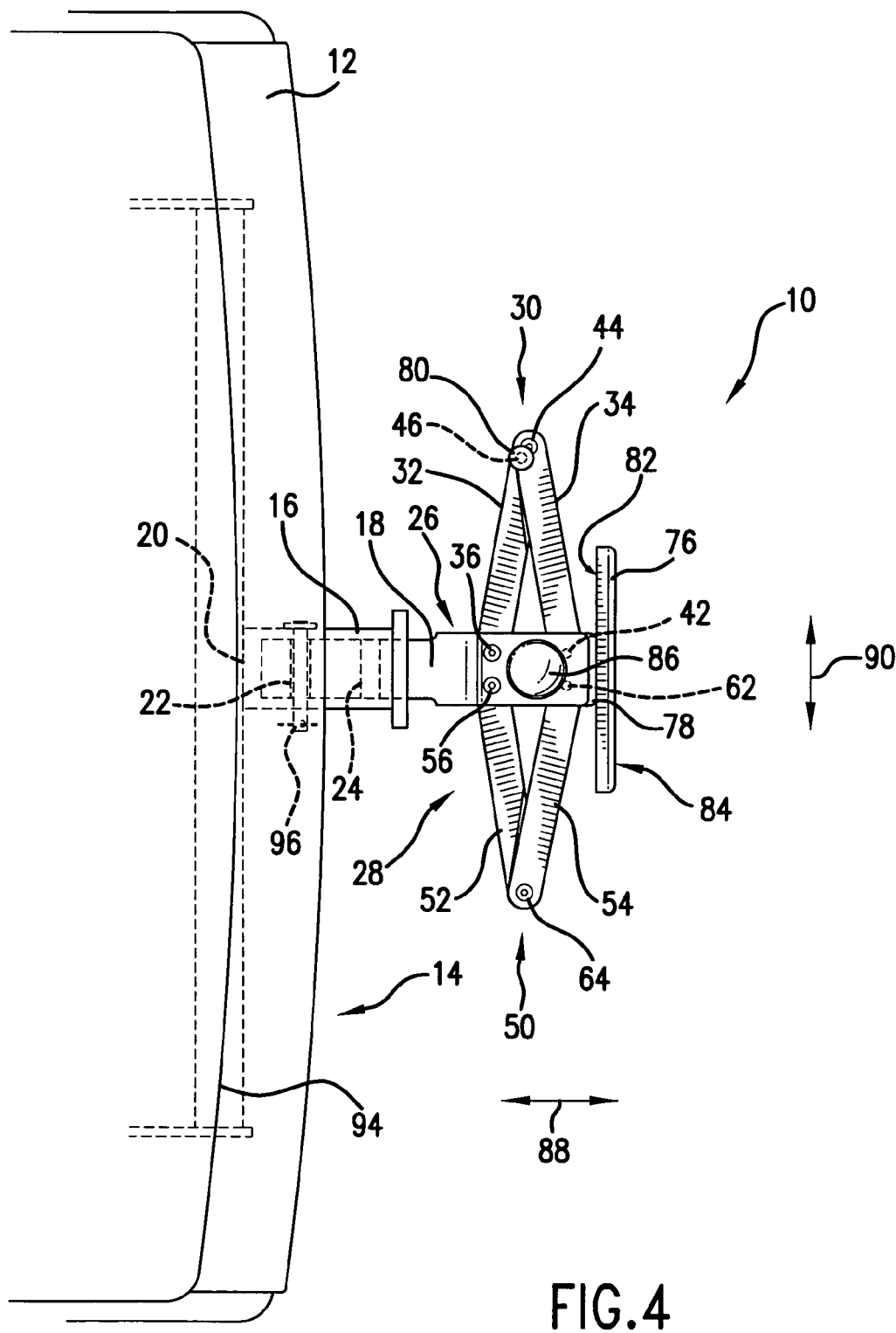
FIG. 4 is a top view of the retractable vehicle step of FIG. 1 attached to a vehicle and in a retracted position.
Figure 5:
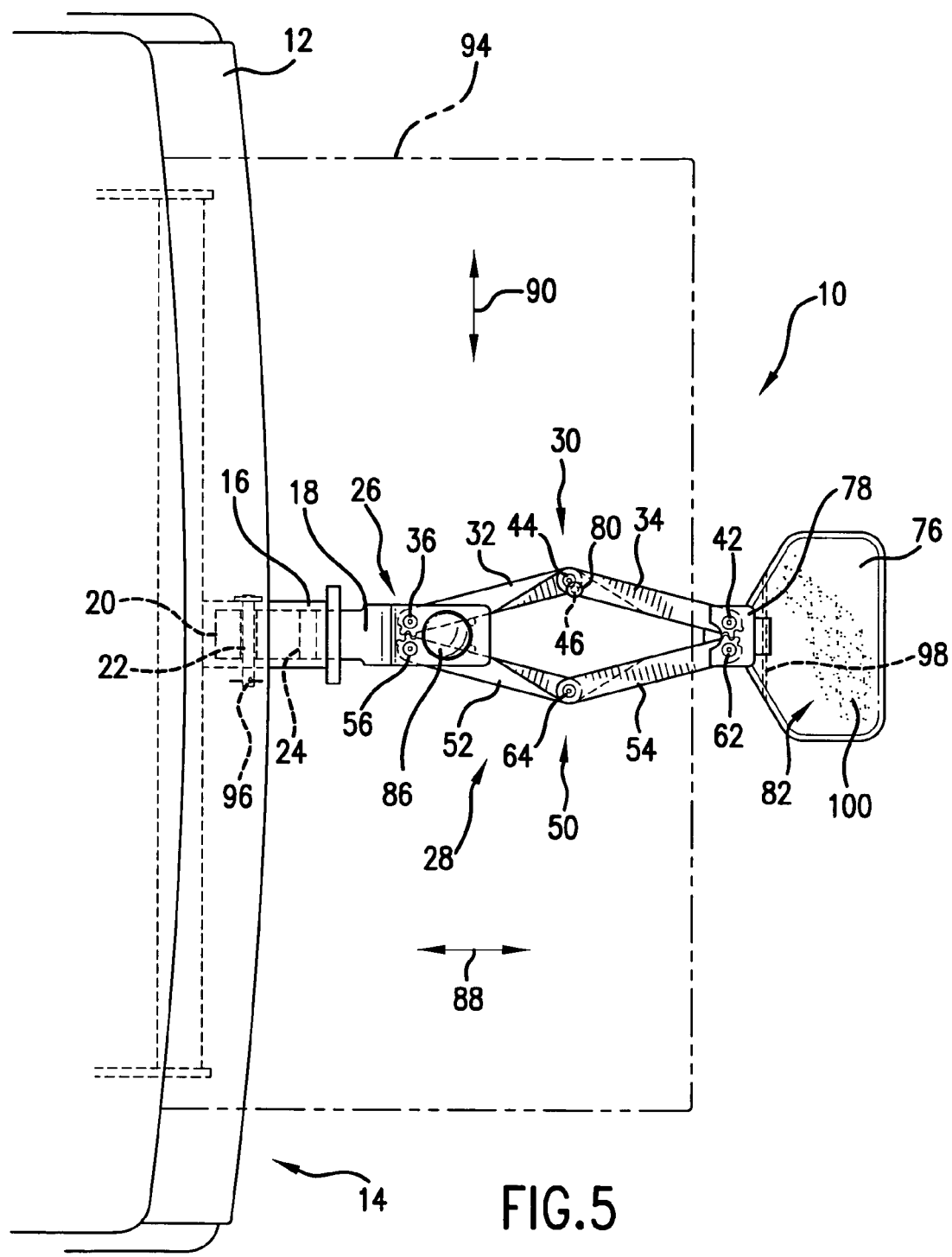
FIG. 5 is a top view of the retractable vehicle step of FIG. 1 attached to a vehicle and in an extended position.

FIG. 4 is a top view of the retractable vehicle step 10 shown attached to the vehicle 12 and oriented in the retracted position. The retractable vehicle step 10 can be configured so that the pair of arms 28 are located completely rearward of the vehicle 12 in the longitudinal direction 88 when in both the retracted position and the extended position. The retractable vehicle step 10 can also be designed so that all of it except for the trailer hitch engagement member 20 is located rearward of the vehicle 12 in the longitudinal direction 88 when both retracted and extended. The pair of arms 28 are configured so that they extend a greater distance outboard in the lateral direction 90 in the retracted position than when in the extended position as shown in FIG. 5. As shown in the retracted position, the pair of arms 28 extend a greater distance outboard in the lateral direction 90 than any other component of the retractable vehicle step 10 including the mounting member 18 and the step 76. The pair of arms 28 allow the step 76 to be extended into a use position without requiring the mounting bracket 18 to be disengaged and then repositioned on the trailer hitch receiver 16. In this manner, the retractable vehicle step 10 does not have to be disconnected from the trailer hitch receiver 16 upon reorientation between the retracted position and the extended position. Further, the pair of arms 28 do not require the trailer hitch receiver 16 to have a depth sufficient to allow the trailer hitch engagement member 20 to be adjusted along its length for proper positioning of the step 76. However, it is to be understood that in accordance with other exemplary embodiments of the present invention that the pair of arms 28 and the trailer hitch engagement member 20 may be variously configured. For example, the pair of arms 28 may be made so that they do not extend outboard of the mounting bracket 18 or the step 76 in the lateral direction 90 when the pair of arms 28 are in the retracted position. Further, the trailer hitch engagement member 20 can be provided with a length sufficient to be positioned along the trailer hitch receiver 16 to allow for adjustment of the position of the step 76.

Referring now in general to FIGS. 1-5, the retractable vehicle step 10 has a step bracket 78 that is pivotally attached to the pair of arms 28. The step bracket 78 is arranged so that it does not rotate or move outboard or inboard in the lateral direction 90 upon repositioning between the extended position and the retracted position. The step bracket 78 moves rearward and forward in the longitudinal direction 88 upon extending and retracting the retractable vehicle step 10 without any other angular reorientation or movement. The step bracket 78 is shaped so as to nest within the body 26 of mounting bracket 18 upon retraction of the pair of arms 28.

The step 76 is pivotally attached to the step bracket 78 by the use of pin 98. Although a pin 98 is shown, any type of arrangement may be used to effect pivoting between the step bracket 78 and the step 76. For example, a piano hinge, friction hinge or a flush hinge may be used. Alternatively, the step 76 can be arranged so as to be disconnected from the step bracket 78 and then reattached thereto in a different orientation. It is also to be understood that in other exemplary embodiments that the step 76 may be rigidly attached to the step bracket 78 and need not be pivotally attached. Likewise, it is to be understood that the presence of the step bracket 78 is not necessary in other embodiments.

The step 76 is capable of being pivoted between a substantially horizontal use position as shown in FIGS. 3 and 5 and a substantially vertical non-use position as shown in FIGS. 1, 2 and 4. In the substantially horizontal use position a stepping surface 82 of the step 76 is presented to the user for stepping on to assist in entering, exiting or accessing the vehicle 12. The stepping surface 82 can be a smooth, bare surface or may be provided with a slip resistant element 100 thereon in order to give the user some degree of traction during use. The slip resistant element 100 can be one or more strips of a material, such as rubber, that has a high coefficient of friction so as to resist slipping. The stepping surface 82 is thus oriented in the horizontal direction during use and can be pivoted upwards by the user into the vertical direction for times of non-use. The stepping surface 82 is shown as being generally rectangular in shape. It is to be understood, however, that the stepping surface 82 can be variously configured in accordance with other exemplary embodiments. For example, the stepping surface 82 can be triangular, circular, oval or square in shape. Also, the size of the stepping surface 82 can be such that it extends outboard beyond the pair of arms 28 in the lateral direction 90 and vertically beyond the mounting bracket 18 and tow ball 86 in the vertical direction 92 when in the vertical non-use position.

Although shown as being oriented in the horizontal direction during full extension of the pair of arms 28, it is to be understood that the step 76 can be oriented so that the stepping surface 82 is substantially horizontal and capable of being stepped on by the user when the pair of arms 28 are in the retracted position. Here, it may be desirable for the user to have the stepping surface 82 located closer to the vehicle 12 in the longitudinal direction 88 as opposed to father away in the extended position.

The step 76 can remain in the substantially horizontal use position under its own weight. Likewise, the step 76 can remain in the substantially vertical non-use position upon simply being oriented therein without the use of any latching device or mechanism. The pin 98 may be designed so as to afford a sufficient amount of frictional resistance to the rotation of step 76 about step bracket 78 so that the step 76 remains in a set position while subjected to vibrational forces brought about by movement of the vehicle 12. It is to be understood, however, that in other embodiments that latching mechanisms may be used to aid in securing the step 76 in a particular position. For example, the step 76 may be made of a magnetic material or a magnet may be applied to the stepping surface 82 so that the step 76 is retained in the substantially vertical non-use position once rotated into contact with the step bracket 78 and magnetically retained thereon. Alternatively, a mechanical latch may be used to hold the step 76 in the substantially horizontal use position and in the substantially vertical non-use position once appropriately oriented.

Figure 6:
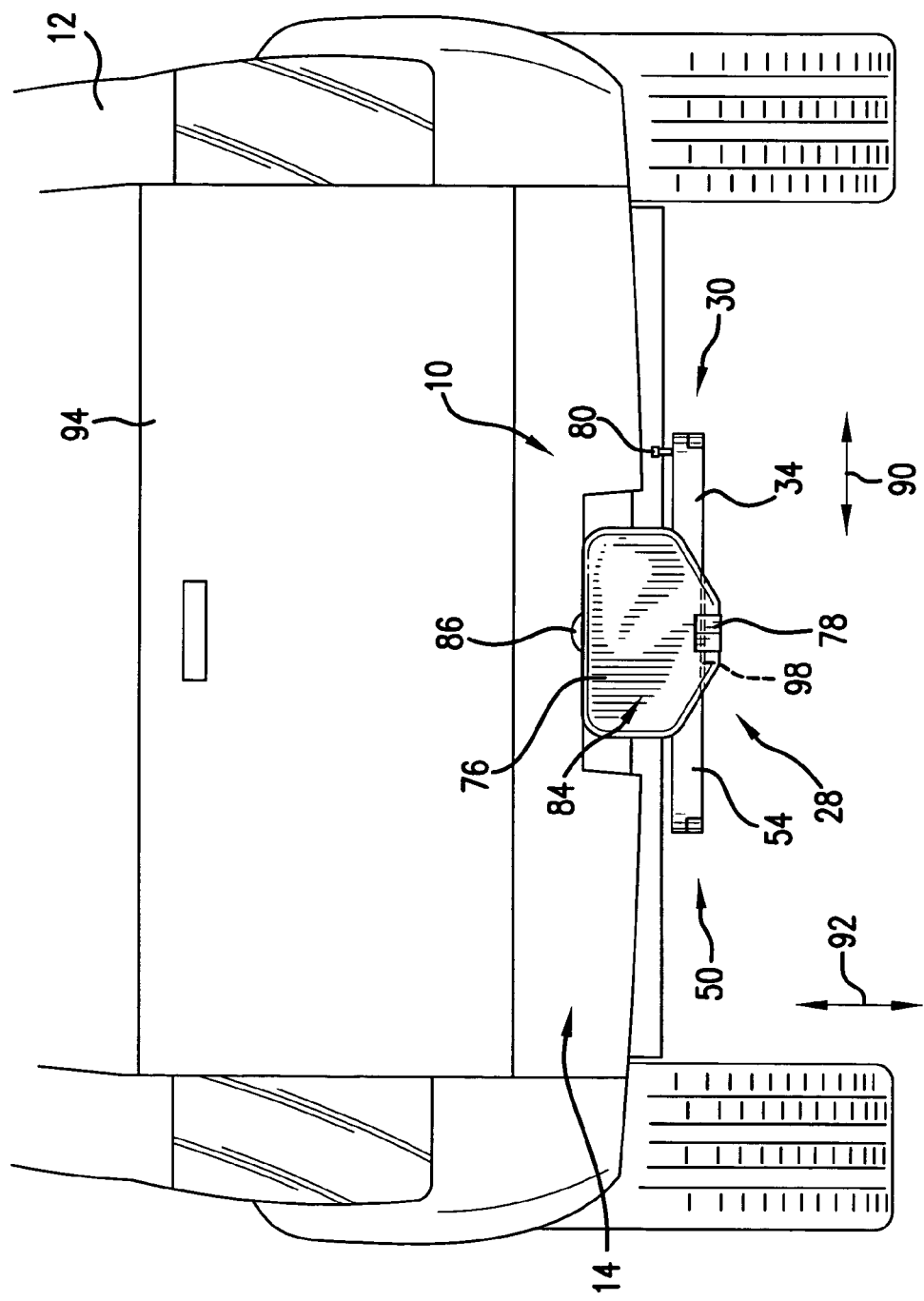
FIG. 6 is a front view of the retractable vehicle step of FIG. 1 attached to a vehicle and in a retracted position.

Orientation of the pair of arms 28 into the retracted position and placement of the step 76 in the substantially vertical non-use position is shown in FIG. 6, which is a front view of the retractable vehicle step 10 shown attached to the rear 14 of the vehicle 12. The step 76 has an advertising surface 84 that is oppositely disposed from the stepping surface 84. The advertising surface 84 is displayed in the orientation of the retractable vehicle step 10 in FIG. 6 so that it is viewable by the public. Various forms of advertising indicia such as company names, product names, sports logos, vehicle logos, personal messages or the like can be located on the advertising surface 84 for display purposes. Alternatively, the advertising surface 84 of the step 74 can remain blank if so desired.

The tow ball 86 can be located so as to be completely above the top of the step 76 in the vertical direction 92 when the step 76 is oriented to the substantially vertical non-use position. In this regard, the shank and ball portion of the tow ball 86 are located vertically above the highest point of the step 76 in the vertical direction 92. In other embodiments, only a portion of the tow ball 86 need be located above the step 76 in the vertical direction 92. The step 76 can be moved to the substantially horizontal use position or some other position besides the substantially vertical position if the step 76 would interfere spatially with the attachment of a coupling body of a trailer to the tow ball 86.

The retractable vehicle step 10 can be configured so that the pair of arms 28, step 76 and mounting bracket 18 are located at or above the trailer hitch receiver 16. This type of configuration may be advantageous in that it may help prevent the retractable vehicle step 10 from scraping on the ground during use of the vehicle 12 as the retractable vehicle step 10 is located higher in the vertical direction 92. However, it is to be understood that various parts, or all of the retractable vehicle step 10 can be located either above or below the trailer hitch receiver 16 in the vertical direction 92 in accordance with various exemplary embodiments of the present invention. Although shown attached to the trailer hitch receiver 16, it is to be understood that the retractable vehicle step 10 can be attached to other portions of the rear 14 of the vehicle 12 in other embodiments. For example, the retractable vehicle step 10 can be attached to the bumper, tailgate 94, trunk or deck lid in accordance with other embodiments. Further, the retractable vehicle step 10 need not be provided at the approximate midpoint of the vehicle 12 in the lateral direction 90. Here, the retractable vehicle step 10 can be positioned outboard so as to be located proximate to one of the wheels of the vehicle 12.

The pair of arms 28 includes a first arm 30 and a second arm 50 as can be seen with reference to FIGS. 4 and 5. The first arm 30 includes a first portion 32 and a second portion 34 that are in pivotal engagement with one another so that the first arm 30 is capable of pivoting essentially about its midpoint. In a similar fashion, second arm 50 has a first portion 52 and a second portion 54 that are pivotally connected to one another so as to render second arm 50 pivotal about its midpoint.

Figure 7:
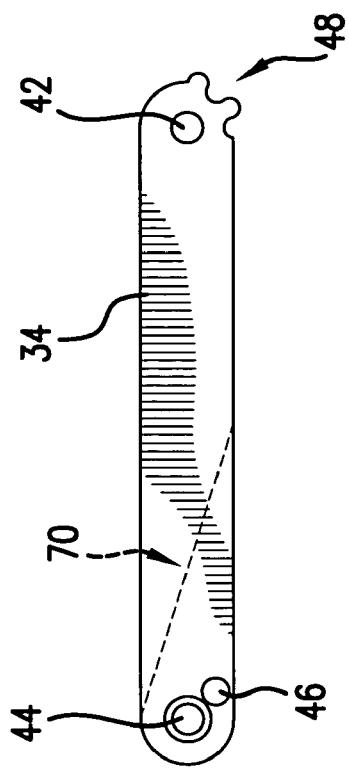
FIG. 7 is a top view of a first portion of a first arm of the retractable vehicle step of FIG. 1.

The first portion 32 of the first arm 30 is shown in greater detail in FIG. 7. Here, the first portion 32 defines an aperture 36 on one end through which a bolt may be disposed in order to pivotally connect the first portion 32 to the body 26 of the mounting bracket 18. It is to be understood, however, that other types of connections are possible to render the first portion 32 pivotal with respect to the mounting bracket 18. The first portion 32 extends in a generally linear direction and defines an aperture 38 on an end opposite that which defines aperture 36. First portion 32 also defines a cut out section 68 which extends at an angle to the length of the first portion 32 and is located on the end of the first portion 32 which defines aperture 38.

Figure 8:
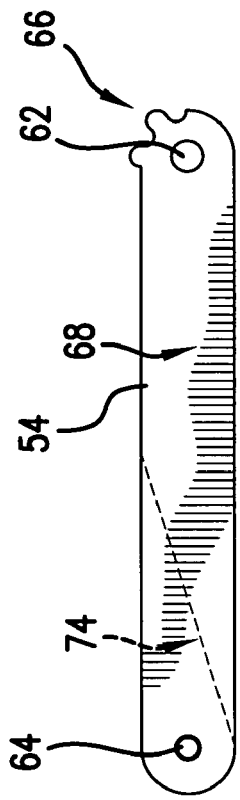
FIG. 8 is a top view of a second portion of a first arm of the retractable vehicle step of FIG. 1.

A second portion 34 of the first arm 30 is shown in greater detail in FIG. 8. The second portion 34 defines an aperture 44 that aligns with aperture 38 of first portion 32 with additional reference to FIGS. 4 and 7. A bolt can be disposed through apertures 44 and 38 so as to pivotally connect the first portion 32 and second portion 34 to one another. The second portion 34 also defines a cut out second 70 that extends at an angle to the length of the second portion 34 and is located on an end of second portion 34 that defines the aperture 44. Cut out portion 70 receives an end of the first portion 32 and cut out portion 68 receives an end of the second portion 34 when the pair of arms 28 are located in the retracted position. With this arrangement, the first and second portions 32 and 34 can pivot from the retracted to the extended position without interference from one another and can be nested in the retracted position so as to minimize the amount of space taken up in the longitudinal direction 88. The second portion 34 also defines an aperture 42 that has a bolt disposed therethrough for pivotally connecting the second portion 34 to the step bracket 78. It is to be understood, however, that the second portion 34 may be pivotally connected to the step bracket 78 in a variety of manners. A locking aperture 46 is further defined in the second portion 34 and is located proximate to aperture 44.

The second arm 50 includes a first portion 52 and a second portion 54 that can be configured in a similar manner to those of the first arm 30. The first portion 52 can be more clearly seen in FIG. 9 and defines an aperture 56 though which a bolt is disposed to render the first portion 52 pivotally connected to the body 26 of the mounting bracket 18. The first portion 52 extends in a lengthwise direction and has a cut out section 72 defined thereon at an angle. Another aperture 58 is defined in an end of the first portion 52 that includes the cut out section 72. The second portion 54 of the second arm 50 is more clearly shown in FIG. 10. The second portion 54 defines an aperture 64 that aligns with aperture 58 of the first portion 52. A bolt is disposed through both apertures 58 and 64 in order to place the first portion 52 into pivotal engagement with the second portion 54 as shown in additional reference to FIG. 4. Cut out section 74 receives part of the first portion 52, and cut out section 72 receives part of portion 54. This type of arrangement allows the first and second portions 52 and 54 to move into and out of the retracted position while maintaining a minimal amount of length in the longitudinal direction 88 when in the retracted position. Aperture 62 is defined in an end of the second portion 54 opposite that of aperture 64. A bolt can be disposed through aperture 62 in order to pivotally connect the second portion 54 to the step bracket 78. It is to be understood, however, that the second portion 54 can be variously connected to the step bracket 78 so as to be rendered pivotal therewith.

A locking member 80, as shown with reference to FIGS. 1, 3 and 5, can be used in order to lock the pair of arms 28 in the extended position. The locking member 80 may be a ball plunger or a spring plunger in accordance with various exemplary embodiment of the present invention. The locking member 80 can be a plunger having part number 83-053-100 that is available from the Travers® Tool Co., Inc. having offices at 128-15 26$^{th}$ Ave., Flushing, N.Y. 11354-0108. The locking member 80 can be disposed in the locking aperture 46 of the second portion 34 of the first arm 30. In the retracted position, the locking member 80 may simply be biased against an upper surface of the first portion 32 of the first arm 30 and provide no resistance to movement of the first arm 30 from the retracted position to the extended position. Once the pair of arms 28, including the first arm 30, are placed into the extended position, the first portion 32 is no longer located underneath the locking aperture 46 of the second portion 34. In this position, the locking member 80 will move downward due to the absence of the first portion 32 and be located next to the side of the first portion 32. The first arm 30 is locked in the extended position because the locking member 80 interferes with movement of the portions 32 and 34 into the retracted position. The second arm 50 is likewise locked into the extended position due to its connection to the step bracket 78 which is held in the extended position by locking of the first arm 30. The user can pull the locking member 80 upwards in order to relive interference with the first portion 32 and thus allow the first arm 30 and consequently the second arm 50 to be returned to the retracted position. The locking member 80 thus acts to lock the pair of arms 28 in the extended position and does not act to lock the arms 28 in the retracted position. It is possible, however, in other exemplary embodiments to provide a locking mechanism that locks the pair of arms 28 in the retracted position or at any point between the extended and retracted positions.

Figure 9:
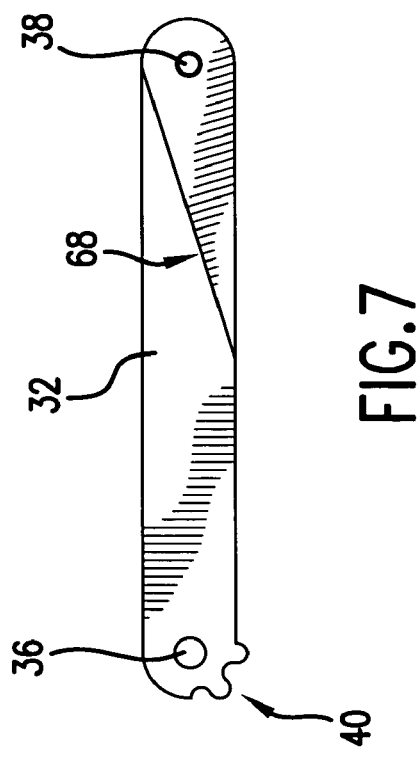
FIG. 9 is a top view of a first portion of a second arm of the retractable vehicle step of FIG. 1.

Referring for the moment to FIGS. 7 and 9, it can be seen that the first portion 32 has a meshing portion 40 and that the first portion 52 has a meshing portion 60. Meshing portions 40 and 60 are located on rounded ends of the first portions 32 and 52 and have a series of projections and intermittently located recesses. The meshing portions 40 and 60 mesh with one another due to the relative location of first portions 32 and 52 on mounting bracket 18. Meshing between the projections and recesses of the meshing portions 40 and 60 acts to hold the first portions 32 and 52 and thus arms 30 and 50 in the retracted position. Some amount of force is thus needed to pivot the first portions 32 and 52 due to meshing of portions 40 and 60. In a similar manner, once extended the meshing portions 40 and 60 interact with one another to resist pivoting between the first portions 32 and 52. Again, some amount of force is required to pivot the first portions 32 and 52 as the meshing portions 40 and 60 act to resist their relative pivoting. The pair of arms 28 can therefore be somewhat held into the retracted position and extended position without requiring a locking mechanism, although a locking mechanism can be employed in certain exemplary embodiments if desired.

Figure 10:
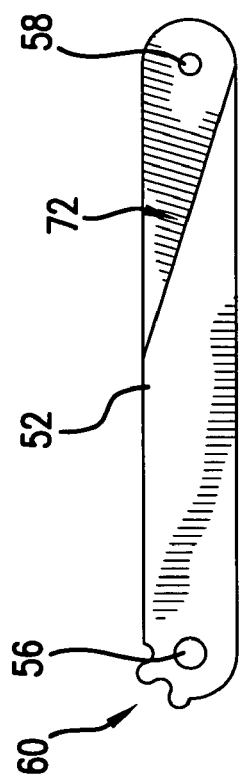
FIG. 10 is a top view of a second portion of a second arm of the retractable vehicle step of FIG. 1.

FIGS. 8 and 10 show a meshing portion 48 on the second portion 34 and a meshing portion 66 on the second portion 54. Meshing portions 48 and 66 are likewise provided with a plurality of projections and recesses. Meshing portions 48 and 66 are placed into communication with one another due to the proximate location of the second portions 34 and 54 on the step bracket 78. Meshing portions 48 and 66 act in a similar manner to meshing portions 40 and 60 to help keep the second portions 34 and 54 in a retracted position and in an extended position. Meshing portions 48 and 66 can act to supplement meshing portions 40 and 60 or may be provided as an alternative thereto. In further exemplary embodiments, meshing portions 40 and 60 are not provided with the pair of arms 28. The meshing portions 40, 60, 48 and 66 also act to place the first arm 30 and second arm 50 into communication with one another so that the arms 30 and 50 extend and retract with one another during extension and retraction of the pair of arms 28.

A variety of materials may be used to make up the various components of the retractable vehicle step 10. For example, the mounting bracket 18, tow ball 86, first arm 30, second arm 50 and step 76 may be made of aluminum, steel or plastic in accordance with various exemplary embodiments of the present invention. The first arm 30 and the second arm 50 can be made of solid portions 32, 34, 52 and 54. Alternatively, one or more of the portions 32, 34, 52 and 54 can be tubular or otherwise hollow in nature. Although described as having a pair of arms 28, it is to be understood that any number of arms may be employed in accordance with other embodiments. Further, the arms 28 can have more than two portions apiece. As such, instead of pivoting about their midpoint, the first arm

30 and second arm 50 can be constructed so as to pivot at two or more locations along their length in accordance with various exemplary embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A retractable vehicle step for use in allowing a user to access a vehicle, comprising:
   a mounting bracket configured for attachment with a trailer hitch receiver of a vehicle;
   a pair of arms pivotally attached to said mounting bracket, said pair of arms movable between an extended position and a retracted position, wherein said pair of arms pivot about axes oriented in the vertical direction, and wherein the relative position between said pair of arms and said mounting bracket in the vertical direction is the same in said extended position and in said retracted position; and
   a step carried by said pair of arms, wherein said step is configured for being stepped on by the user to access the vehicle, wherein said step is closer to said mounting bracket in said retracted position of said pair of arms than in said extended position of said pair of arms.

2. The retractable vehicle step as in claim 1, wherein a first arm of said pair of arms has a first portion pivotally attached about a vertical axis to a second portion, and wherein a second arm of said pair of arms has a first portion pivotally attached about a vertical axis to a second portion.

3. The retractable vehicle step as in claim 2, wherein an end of said first portion of said first arm and wherein an end of said first portion of said second arm are pivotally attached to said mounting bracket to effect pivotal attachment of said pair of arms to said mounting bracket, and further comprising a step bracket pivotally attached to an end of said second portion of said first arm about a vertical axis and pivotally attached to an end of said second portion of said second arm about a vertical axis, wherein said step bracket carries said step, and wherein said step is pivotally attached to said step bracket such that said step is capable of pivoting about a horizontal axis.

4. The retractable vehicle step as in claim 1, further comprising a locking member configured for locking said pair of arms in said extended position.

5. The retractable vehicle step as in claim 1, wherein said step has a stepping surface onto which the user can step to access the vehicle, and wherein said step is configured for being oriented between a use position in which said stepping surface is substantially horizontal and a stored position in which said stepping surface is substantially vertical.

6. The retractable vehicle step as in claim 5, wherein said step has an advertising surface oppositely disposed from said stepping surface, wherein said advertising surface has advertising indicia displayed thereon.

7. The retractable vehicle step as in claim 1, further comprising a tow ball attached to said mounting bracket.

8. The retractable vehicle step as in claim 1, wherein said pair of arms are configured for being located completely rearward of the trailer hitch receiver when said pair of arms are in said extended position, and wherein said pair of arms are configured for being located completely rearward of the trailer hitch receiver when said pair of arms are in said retracted position.

9. The retractable vehicle step as in claim 1, wherein said pair of arms extend farther outboard in the longitudinal direction of the vehicle when said pair of arms are in said retracted position as opposed to when said pair of arms are in said extended position when said mounting bracket is attached to the trailer hitch receiver.

10. The retractable vehicle step as in claim 1, wherein said pair of arms are unlatched when in said retracted position, and wherein said step is pivotable between a use position and a stored position, and wherein said step is unlatched when in said use position and said stored position.

11. A retractable vehicle step for use in allowing a user to access a vehicle, comprising:
    a mounting bracket configured for attachment with the rear of a vehicle;
    a tow ball attached to said mounting bracket;
    a pair of arms pivotally attached to said mounting bracket about vertical axes, wherein said pair of arms are movable between an extended position of said arms and a retracted position of said arms; and
    a step carried by said pair of arms such that said step is carried by said mounting bracket, wherein said step is configured for being stepped on by the user to access the vehicle, wherein said step is movable between an extended position of said step and a retracted position of said step when said pair of arms are moved between said extended position of said arms and said retracted position of said arms, wherein said step is located rearward of said tow ball when said step is in said extended position of said step and in said retracted position of said step.

12. The retractable vehicle step as in claim 11, wherein said step in said extended position of said step is located rearward of a lowered tailgate of the vehicle when said mounting bracket is attached to the rear of the vehicle with the tailgate.

13. The retractable vehicle step as in claim 11, wherein a first arm of said pair of arms has a first portion pivotally attached to a second portion, and wherein a second arm of said pair of arms has a first portion pivotally attached to a second portion, and wherein an end of said first portion of said first arm and wherein an end of said first portion of said second arm are pivotally attached to said mounting bracket to effect pivotal attachment of said pair of arms to said mounting bracket, and further comprising a step bracket pivotally attached to an end of said second portion of said first arm and pivotally attached to an end of said second portion of said second arm, wherein said step bracket carries said step, and wherein said step is pivotally attached to said step bracket such that said step is capable of pivoting about a horizontal axis.

14. The retractable vehicle step as in claim 11, further comprising a locking member configured for locking said step in said extended position.

15. The retractable vehicle step as in claim 11, wherein said step has a stepping surface onto which the user can step to access the vehicle, and wherein said step is configured for being oriented between a use position in which said stepping surface is substantially horizontal and a stored position in which said stepping surface is substantially vertical.

16. The retractable vehicle step as in claim 15, wherein said step is unlatched when in said retracted position.

17. The retractable vehicle step as in claim 15, wherein said step has an advertising surface oppositely disposed from said stepping surface, wherein said advertising surface has advertising indicia displayed thereon.

18. The retractable vehicle step as in claim 11, wherein said mounting bracket has a trailer hitch engagement member that has a square shaped outer perimeter, wherein said trailer hitch engagement member is configured for attachment to a trailer hitch receiver of the vehicle.

19. A retractable vehicle step for use in allowing a user to access a vehicle, comprising:
   a mounting bracket configured for attachment with a trailer hitch receiver of a vehicle;
   a tow ball attached to said mounting bracket;
   a pair of arms movable between an extended position and a retracted position, wherein a first arm of said pair of arms has a first portion pivotally attached to a second portion about a vertical axis, and wherein a second arm of said pair of arms has a first portion pivotally attached to a second portion about a vertical axis, and wherein said first portion of said first arm is pivotally attached to said mounting bracket about a vertical axis, and wherein said first portion of said second arm is pivotally attached to said mounting bracket about a vertical axis, wherein the relative position between said pair of arms and said mounting bracket in the vertical direction is the same in said extended position and in said retracted position;
   a locking member configured for locking said pair of arms in said extended position;
   a step bracket, wherein said second portion of said first arm is pivotally attached to said step bracket about a vertical axis, wherein said second portion of said second arm is pivotally attached to said step bracket about a vertical axis; and
   a step pivotally attached to said step bracket about a horizontal axis, wherein said step has a stepping surface onto which the user can step to access the vehicle, and wherein said step is configured for being pivoted between a use position in which said stepping surface is substantially horizontal and a stored position in which said stepping surface is substantially vertical.

* * * * *